United States Patent [19]
Möller et al.

[11] Patent Number: 4,962,690
[45] Date of Patent: Oct. 16, 1990

[54] RELAY-CONTROLLED VALVE

[75] Inventors: Johannes Möller, Wennigsen; Erwin Petersen, Wunstorf; Johann Rothen, Sarstedt, all of Fed. Rep. of Germany

[73] Assignee: WABCO Fahrzeugbremsen GmbH, Hanover, Fed. Rep. of Germany

[21] Appl. No.: 398,673

[22] Filed: Aug. 25, 1989

Related U.S. Application Data

[63] Continuation-in-part of Ser. No. 236,070, Aug. 24, 1988, abandoned.

[30] Foreign Application Priority Data

Sep. 12, 1987 [DE] Fed. Rep. of Germany ....... 3730778

[51] Int. Cl.$^5$ ............................................ F15B 13/043
[52] U.S. Cl. ........................................ 91/459; 91/461; 137/627.5; 303/119
[58] Field of Search ...................... 137/627.5; 303/119; 91/459, 461

[56] References Cited

U.S. PATENT DOCUMENTS

| | | | |
|---|---|---|---|
| 3,826,542 | 7/1974 | Peruglia | 303/119 |
| 4,903,576 | 2/1990 | Hofler et al. | 91/459 |

FOREIGN PATENT DOCUMENTS

| | | |
|---|---|---|
| 2145433 | 3/1973 | Fed. Rep. of Germany . |
| 2503792 | 8/1976 | Fed. Rep. of Germany . |
| 2555998 | 6/1977 | Fed. Rep. of Germany . |
| 2500483 | 7/1977 | Fed. Rep. of Germany . |
| 2586221 | 2/1987 | France . |
| 2098293 | 11/1982 | United Kingdom . |

*Primary Examiner*—Gerald A. Michalsky
*Attorney, Agent, or Firm*—Horst M. Kasper

[57] ABSTRACT

A relay valve unit having a control pressure communication line for the relay valve equipped with a reducer unit so that when activating the relay valve, any delay is either non-existent or negligibly larger than would be required for the complete opening of the relay valve.

20 Claims, 2 Drawing Sheets

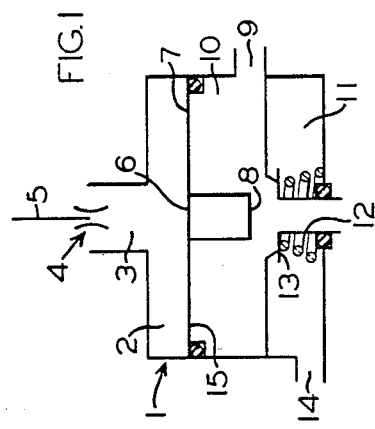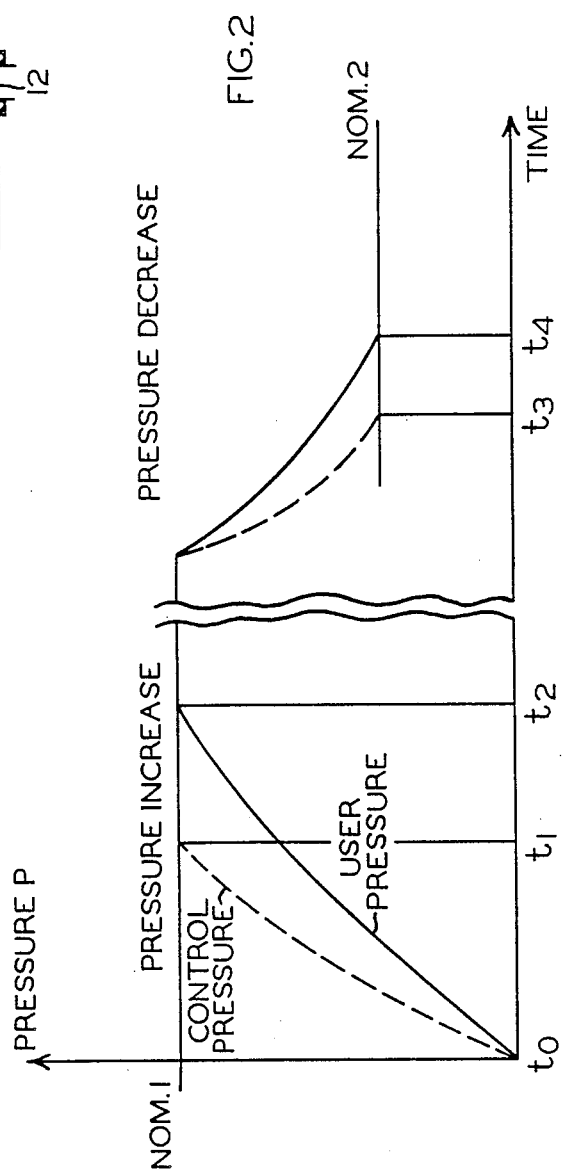

RELAY-CONTROLLED VALVE

This is a continuation-in-part of copending application(s) Ser. No. 07/236,070 filed on Aug. 24, 1988, now abandoned.

FIELD OF THE INVENTION

The present invention relates, in general, to relay valves used in fluid-pressure systems and, more particularly, this invention relates to fluid-pressure controlled feed and exhaust lines which control such relay valves during operation of such fluid-pressure systems.

BACKGROUND OF THE INVENTION

Prior to the present invention, the concept of controlling a relay valve by fluid pressure communication and exhaust lines has been taught. For example, this relay valve control concept has been taught in WABCO Brochure 973001, issued in Feb., 1977. The particular relay valve taught in this brochure includes, at a position above its relay piston, a control chamber, and at a position below such relay piston, a release chamber. Such control chamber and release chamber are identified in the brochure as 7 and 6, respectively. By means of a control pressure fluid communication line, which also includes a control connection, identified as 4, the control pressure can be communicated into the control chamber 7, and such control pressure can be exhausted from this control chamber 7. On the one hand, the exhaust chamber is connected with a fluid pressure user circuit by means of an operating connection, identified as 2. On the other hand, in this prior art relay valve, the exhaust chamber can be connected to a pressure release chamber by way of an inlet valve, identified as 5, and a supply connection, identified as with a fluid pressure medium supply source, or by way of an outlet valve, identified as 6, and a pressure-release line, identified as 3. This prior art relay valve can be activated in a number of ways. For example, such relay valve will be activated by either supplying or exhausting a control pressure into, or out of, the control chamber 7 so that such relay piston may activate the relay valve accordingly. With this particular prior art relay valve, the same control pressure is being achieved in the relay valve as a consequence of the design of the relay piston. The design of the relay piston results in an equal control pressure in the exhaust chamber and in the consumer circuit after the operation of the valve.

As used in the present specification, the terms "User System Volume" and "Control Chamber Volume" are to be considered as including the volumes of their respective operating lines and of the outlet chamber and of the control pressure fluid communication line.

Now, for the purposes of understanding the problems associated with relay valve control that exist with the prior art control schemes, let us assume that the flow resistance of any existing operating line is such that at fully open valve units the user pressures that exist in the outlet chamber of the relay valve and in the user circuit will always be roughly equal. Normally, the user circuit volume is larger than the volume of the control chamber 7. Consequently, because of the flow resistance within the operating circuit or the above-described user circuit volume, the customary prior art relay valves will react, after a certain delay period, upon a control pressure command, which means: The user pressure reacts after control pressure command (in time).

This relationship is illustrated schematically in the pressure versus time graph of FIG. 2 of the drawings. Such schematic illustration of FIG. 2 indicates a pressure-increase phase on the left and a pressure-drop phase on the right. Parallel to the time axis, on the left-hand side of the graph, a NOMINAL$_1$ line is for the desired first NOM user pressure and, on the right-hand side of the graph, an additional NOMINAL$_2$ is illustrated in relation to the time axis, which depicts a termination of the pressure-drop phase of the desired second NOM user pressure. It is evident to those persons who are skilled in the fluid pressure control art that in the pressure-increase phase, the control phase reaches the NOM$_1$ value at time $t_1$, whereas the user pressure will attain this value only at a later time $t_2$. The difference between the time $t_2-t_1$ constitutes the delay time. Those skilled in the art will, likewise, recognize that in the pressure-drop phase, the delay period will be $t_4-t_3$.

There are cases, which can be envisioned, where such delay will cause problems in operating systems. A case exists, for example, when the user circuit will consist of one or several brake cylinders for an anti-lock brake system on a vehicle. If we assume that the user pressure, which has been reached at $t_1$, and the vehicle wheel or wheels, which are part of the user circuit, have attained the locking limit, then the anti-locking circuit of such anti-lock brake system emits at that time, a signal, which triggers a discontinuation of the control pressure. In spite of the disrupted control pressure, the user pressure will continue to rise until reaching the NOM$_1$ value at a time $t_2$. The delayed increase in user pressure in the delay time period $t_2-t_1$ normally will lead to an undesirable high slip of the vehicle wheel, or it will at least require special steps for its avoidance. The same is true, for example, when the wheel at the first NOM user pressure has reached its locking limit and the anti-locking circuit initiates a pressure-release phase. This is shown in the right portion of the schematic illustration of FIG. 2. The result, in this particular case, is an inferior braking action instead of a high slip. In this event, consumption of fluid pressure will increase.

SUMMARY OF THE INVENTION

The present invention provides a relay valve that can be activated by a control pressure supply and exhaust. Such relay valve, on one hand, is connected to a control chamber by means of a control pressure fluid communication line, and is connected with a fluid pressure user circuit. The relay valve, on the other hand, is connected over valve units to a pressure source or a release chamber with an over-pressure, free-release chamber. In the control pressure fluid communication line, a pressure reducer of a predetermined size has been located such that upon operation of the relay valve, the customary delay in user pressure in the outlet chamber, as compared to the control pressure, is not or is only minutely larger than absolutely essential for a complete opening of the valve.

OBJECTS OF THE INVENTION

It is, therefore, one of the primary objects of the present invention to provide an improved relay valve arrangement that is relatively simple and configured in such a manner that in a given fluid pressure user circuit, the delay in such user circuit versus the control pressure is reduced to an unavoidable amount.

Another object of the present invention is to provide a design of a relay valve in which the relay piston is designed to accomplish a user pressure which may be either above or below the control pressure.

Still another object of the present invention is to provide an improved relay valve arrangement which can be utilized with any suitable pressure medium.

Yet another object of the present invention is to provide an improved relay valve arrangement which is cost-effective when the control pressure fluid communication line is emptied by means of a pair of shut-off valves, or a shut-off and switching valve combination, each of which are solenoid-controlled.

A further object of the present invention is to provide an arrangement of a relay valve that is particularly well-suited to interact with an electronic anti-locking portion of a vehicle braking system.

In addition to the various objects and advantages of the present invention, described above, various other objects and advantages of the relay valve control arrangement will become more readily apparent to persons skilled in the fluid communication control valve art from the following more detailed description of the invention, particularly when such description is taken in conjunction with the attached drawing Figures and with the appended claims.

BRIEF DESCRIPTION OF THE DRAWINGS

FIG. 1 is a schematic illustration of a relay valve arrangement according to one embodiment of the present invention;

FIG. 2 is a graph illustrating schematically pressure versus time;

BRIEF DESCRIPTION OF THE INVENTION

Figure 3:
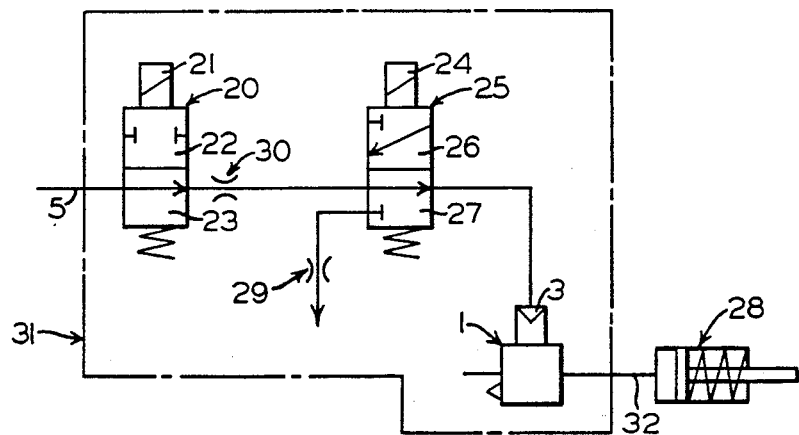
FIG. 3 is a schematic illustration of a relay valve arrangement according to the present invention utilizing solenoid-controlled pressure supply and exhaust lines.

Prior to proceeding to the more detailed description of the present invention, it should be noted that throughout the several views of the drawings, identical components having identical functions have been identified with identical reference numerals.

In addition, although the invention will be described using pneumatic pressure as the fluid pressure medium, the invention is suitable fluid and can be effectively utilized with any suitable fluid pressure medium. Normally, in the case of hydraulic fluid, for example, as the fluid pressure medium, such hydraulic fluid collected in the pressure-release chamber will be returned to the source of such hydraulic fluid. That is, it will be recharged to storage pressure. In the case of compressed air being used as such fluid pressure medium, the atmosphere is one advantageous location into which the pneumatic pressure can be released.

Now, refer more particularly to FIG. 1. The relay valve unit illustrated therein, generally designated 1, shows a control chamber 2 located on top of a relay piston 6. Located below such relay piston 6 is release chamber 10. A control pressure fluid communication line 5, which includes a connection 3, for connecting such control pressure fluid communication line 5 to the relay valve unit 1, can be supplied with control pressure from the control chamber 2, or can be exhausted.

The exhaust chamber 10 is, on one hand, equipped with a supply connection 9 for connecting the relay valve unit 1 to a fluid pressure user circuit, which does not form a part of the present invention and, therefore, is not shown. On the other hand, the exhaust chamber 10 is connected by way of a valve 8, 12 and 13 to a pressure storage chamber 11. The pressure storage chamber 11 is then connected to a supply connection 14 and a fluid pressure medium source which is also not shown, or to the atmosphere as a fluid pressure medium pressure-release space.

The valve 8, 12 and 13 consists of an entry valve portion 12 and 13 and an exhaust valve portion 8 and 12. The valve 8, 12 and 13 design includes a hollow valve body 12, which can be moved, and which can, with a housing-mounted valve seat 13, form the entry valve portion 12 and 13 and with the valve seat 8 at the valve piston 6 form the outlet valve portion B and 12.

The relay piston 6 limits with its area 7, which serves as a control area to delineate the control chamber 2, and with the other area 15, which serves as a weigh area, to delineate the outlet chamber 10.

Within the control pressure fluid communication line 5, a reducing unit, such as a throttle 4, has been added. This reducing unit 4 forms a portion of the control connection 3, but it can also be mounted at any other location along the fluid communication line 5. Cases exist, for example, where a different location is advantageous for easy access to the reducing unit 4.

For the following functional operating description, it is assumed that atmospheric pressure exists in the control chamber 2, the fluid pressure consumer circuit, and in the exhaust chamber 10. In this condition, the inlet valve portion 12 and 13 is closed by a spring and the exit valve portion 8 and 12 is open. The control pressure introduced into the control chamber 2 controls the position of the area 7 of the relay piston 6 and moves such relay piston 6 together with the valve seat 8. When moving downwardly, as seen in FIG. 1, the valve seat 8 seats on a double valve body 12 and moves it as well. The outlet valve portion 8 and 12 will hereby close and the inlet valve portion 12 and 13 will open When a user pressure has been built up in the fluid pressure user circuit and in the outlet chamber 10, the relay piston 6, acting on the weighing area 15, will balance the control pressure acting on the control area 7, thus moving the relay piston 6 back until the outlet valve portion 8 and 12 and the inlet valve portion I and 13 are closed. This condition constitutes the final position of the valve 8, 12 and 13. When the user circuit and the outlet chamber 10 are under user pressure and a higher control pressure is supplied, the relay piston 6 and the valve unit 8, 12 and 13 will act in unison from the end position, as described above.

On the other hand, when the control pressure is exhausted from the control chamber 2, the relay piston 6 is moved by the user pressure over the weigh area 15, whereby the outlet valve portion 8 and 12 will open and the fluid pressure medium will be released from the fluid pressure user circuit and the outlet chamber 10 by way of the hollow inner space of the valve body 12 into the atmosphere. When returning to a balanced condition at the relay piston 6 by reducing the user pressure, the relay piston 6 and the valve seat 8 will return to the end position of the valve 8, 12 and 13.

In order to either increase or decrease the user pressure in the fluid pressure user circuit, the required pressure volume must flow through either the inlet valve portion 12 and 13 or the outlet valve portion 8 and 12. The cross-sectional area of the inlet valve portion 12 and 13 or of the outlet valve portion 8 and 12, the volume of the user circuit, and the flow resistance of a given operation, will determine either the increase in velocity or the decrease in velocity of the user pressure (within the fluid pressure user circuit) and the pressure in the outlet chamber 1?. The reducing unit 4 has the function of holding the delay of the user pressure in relation to the control pressure to a size which assures a complete opening of the valve 8, 12 and 13, and to hold the increase and decrease in velocity of the control pressure in the control chamber 2 as close as possible to the increase and decrease in velocity of the user pressure i the exhaust chamber 10. This function is achieved by ensuring that the flow section $A_{thr}$ of the reducing unit 4 obeys the formula $$A_{thr} \leq A_{VALVE} \cdot \frac{V_{CONTROL}}{V_{SYSTEM}}$$

wherein:

$A_{VALVE}$ is the flow section of the valve units when fully open;

$V_{CONTROL}$ is the control chamber volume; and $V_{SYSTEM}$ is the user circuit volume.

This formula does not take into consideration the flow resistance associated with any fluid communication lines within the user circuit (e.g., fluid communication line 32 of FIG. 2). This is possible because this flow resistance associated with such fluid communication line 32 is normally negligible when it is compared to the flow resistance of the valve units 8, 12 and 13.

In relation to the pressure/time schematic of FIG. 2, this means that the control pressure curves in the pressure-increase and pressure-decrease phases are shifted into such time extension that they nearly match the respective- user pressure curve. This will avoid a delay in the user pressure, as compared with the control pressure.

Since the decrease of the user pressure follows normally the shortest path over a large section (hollow space of the valve body 12), the above-described delay in the pressure-decrease phase is usually less than that in the pressure-increase phase. This phenomenon can be interpreted as an improvement in the time relationship by adjusting the reducing unit 4 in a flow direction of the outflowing control pressure for a reduced flow resistance.

When the relay valve 1 is to be used alternatively for fluid pressure user circuits with different volumes, it is advantageous to adjust the reducing unit 4, such as, the throttle, to the fluid pressure user circuit having the largest volume. In this case, the time relationship in conjunction with the fluid pressure user circuits of smaller volumes will be fitted to the user volume with the largest volume, i.e., in regard to the relay valve 1, it will be worse. This disadvantage, however, will be compensated for by the advantage of a uniform design of the relay valve 1.

Now, refer more particularly to FIG. 3, wherein a design of the relay valve 1 is illustrated in which the control pressure fluid communication line 5 is controlled by a solenoid valve 20 and a solenoid-controlled shifting valve 25.

Illustrated in this embodiment of the invention is a brake cylinder 28 and a work line 32 symbolizing the fluid pressure user circuit, whereby the brake cylinder 28 is used to symbolize several cylinders, and the work line 32 can symbolize several fluid-pressure communication lines.

The solenoid shut-off valve 20 shows a first position 23 and a second position 22. In the first position 23, which exists with a deenergized solenoid magnet 21, the solenoid shut-off valve 20 will release the control pressure fluid communication line 5. In the second position 22, which exists with energizing of the solenoid magnet 21, the solenoid shut-off valve 20 will block the control pressure fluid communication line 5.

The shifting valve 25 has a first position 27 and a second position 26. In the first position 27, which is created with a deenergized solenoid magnet 24, the shifting valve 25 will release the control pressure fluid communication line 5. In the second position 26, which exists with the energizing of the solenoid magnet 24, the shifting valve 25 will block the control pressure fluid communication line 5, and thus connects the down-current portion and thereby the control connection 3, as well as the control chamber 2 of the relay valve 1 with the atmosphere.

For resetting of the solenoid shut-off valve 20 and the solenoid shifting valve 25 into the respective first position 23 or 27, springs are preferably used. The resetting can also be accomplished by other means, however, such as, by fluid pressure.

The reducing units 30 and 29, as illustrated, consists of a solenoid shut-off valve 20 with a reducing unit 30 and a reducing unit 29 located at the pressure outlet. The reducer units 30 or 29 can be of different size or can be differently adjustable. The reducer units 29 or 30 are symbolic depictions only, and the proper design is dependent on the flow resistance of the solenoid shut-off valve 20 and the solenoid shifting valve 25.

In normal operation, the solenoid magnets 21 and 24 are deenergized and the control pressure fluid communication line 5 is open. In this position, the control pressure is admitted to the control connection 3 and the control chamber 2 of the relay valve 1, and transformed into user pressure by the relay valve 1, as described above.

By energizing the solenoid magnet 21 of the solenoid shut-off valve 20, the pressure setting is adjustable. By blocking the control pressure fluid communication line 5, the control pressure, or an increase of the pressure in the control chamber 2 of the relay valve 1, no pressure increase will result because no user pressure will increase and the user pressure cannot increase further.

By energizing the solenoid magnet 24 of the solenoid shifting valve 25, a resetting from the pressure-increase position into a pressure-decrease position is possible. From the pressure setting position, it is possible to shift into the pressure-decrease position by simultaneous deenergizing of the solenoid magnet 21 and the energizing of the solenoid magnet 24. In the pressure-decrease position, the control pressure fluid communication line 5 is blocked by the solenoid shifting valve 25; but at the same time, the down-current part of the solenoid shifting valve 25, and thus control chamber 2 of the relay valve 1, is connected with the atmosphere. The hereby caused control pressure-drop will activate the relay valve 1 in the above-described way, causing a respective drop in the user pressure.

The design of the illustrated system can be reset by one of the solenoid magnets 21 or 24 between the pressure-increase position, the pressure-holding position, and the pressure-decrease position. This solenoid-controlled resetting possibility can be used effectively in conjunction a an anti-locking device for one or several vehicle brakes within the same circuit. The operational description shows that the reduction of the delay in user pressure which the invention tries to achieve, especially in relation to the control pressure, is of great advantage.

A dotted line 31 is used to indicate how the relay valve can be partially or completely integrated with other units and how such units or components can form separate sub-units.

It is obvious that the sequence of the solenoid shut-off valve 20 and of the solenoid shifting valve 25 can be changed, as long as the arrangement remains in line.

Figure 4:
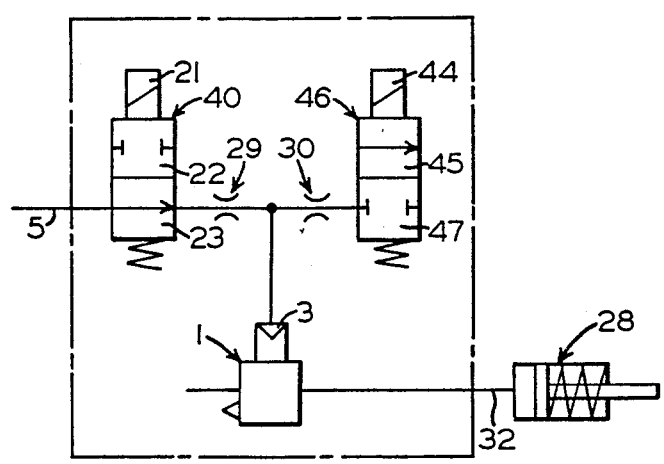
FIG. 4 is a schematic illustration of an alternative relay valve arrangement according to the present invention which also utilizes solenoid-controlled pressure supply and exhaust lines.

For the embodiment illustrated in FIG. 4, the explanations given in previous examples will apply respectively.

For the control of the control pressure fluid communication line 5, a first solenoid-controlled shut-off valve 40 and a second solenoid-controlled shut-off valve 46 are used. The second solenoid-controlled shut-off valve 46 is parallel to the first solenoid-controlled shut-off valve 40, located downstream from the first solenoid-controlled shut-off valve 40 control pressure fluid communication line 5.

The design of the first solenoid-controlled shut-off valve 40, as shown by the same symbols for solenoid and position, is identical to the other solenoid-controlled shut-off valve 20.

The second solenoid-controlled shut-off valve 46 has a first position 45 and a second position 47, which corresponds to that of the first solenoid-controlled shut-off valve 40, but with the solenoid magnet 44 operating in reverse. Both solenoid magnets 21 and 44 are deenergized in the pressure-increase position. The reversal into the pressure-holding position is accomplished by energizing the solenoid magnet 21.

To change from the pressure-holding position into the pressure-decrease position, the solenoid magnet 21 must receive a signal from the other solenoid magnet 44. To change from the pressure-increase position to the pressure-decrease position, the simultaneous energizing of both solenoid magnets 21 and 44 is required. This will require a doubling of the exiter current, which represents a certain disadvantage, as compared with the example shown in FIG. 3. This disadvantage is especially severe when the fluid pressure user circuit is a brake circuit for a vehicle trailer, as such vehicle trailer is normally supplied by means of plug-in connectors and long lines from the cab; where, as a consequence of long lines and the limitations of plug-in connectors, which is of special concern when trucks are hauling several trailers (as is the case in many countries), such pressure differential will have serious consequences.

The same explanations are valid for the individual designs shown, unless specifically mentioned differently.

A further development of this invention will lead to a further cost reduction, or to the creation of a more compact design. This can be accomplished when the reducing unit consists of one or several of the above-mentioned solenoid-controlled valves.

It should be apparent to those skilled in the art that the safety range of this invention is not limited to the specific embodiments illustrated and explained in detail, but such safety range would apply to all embodiments that would come within the scope of the appended claims.

Although a presently preferred and a number of alternative embodiments of the relay valve apparatus of the present invention have been explained in detail above, it should be obvious to persons skilled in the fluid pressure control valve art that various other modifications and adaptations can be made in such relay valve apparatus without departing from the spirit and scope of the attached claims.

We claim:

1. A relay valve apparatus, said relay valve apparatus comprising:
   (a) a control chamber positioned within said relay valve apparatus, said relay valve apparatus being activated by a fluid control pressure supplied to said control chamber and by a reduction of said fluid control pressure, said control chamber being connected for fluid communication with a fluid control pressure fluid communication line;
   (b) an outlet chamber positioned within said relay valve apparatus, said outlet chamber connected for fluid communication at an outlet side thereof to a fluid pressure user circuit;
   (c) a plurality of valve units connectable at an inlet side of said control chamber to at least one of a fluid pressure supply source and an over-pressure free release space; and
   (d) a throttle arrangement positioned in said fluid control pressure communication line, a flow section $A_{thr}$ of said throttle arrangement obeying the formula $$A_{thr} \leq A_{VALVE} \cdot \frac{V_{CONTROL}}{V_{SYSTEM}}$$

wherein:
$A_{VALVE}$ is the flow section of the valve units when fully open;
$V_{CONTROL}$ is the control chamber volume; and
$V_{SYSTEM}$ is the user circuit volume.

2. An apparatus, according to claim 1, wherein compressed air is used as a fluid pressure medium and atmosphere serves as said over-pressure free release space.

3. An apparatus, according to claim 2, wherein said fluid control pressure communication line is controlled by a solenoid shut-off valve which blocks said fluid control pressure communication line when a solenoid magnet of said solenoid shut-off valve is energized, and by a solenoid-controlled shifting valve which blocks said fluid control pressure communication line and connects a portion of said fluid control pressure communication line downstream of said solenoid-controlled shifting valve with said over-pressure free release space when a solenoid magnet of said solenoid-controlled shifting valve is energized.

4. An apparatus, according to claim 2, wherein said fluid control pressure communication line is controlled by a first solenoid-controlled shut-off valve which blocks said fluid control pressure communication line when a solenoid magnet of said first solenoid-controlled shut-off valve is energized, and by a second solenoid-controlled shut-off valve which connects said fluid control pressure communication line with said over-pressure free release space when a solenoid magnet of said second solenoid-controlled shut-off valve is energized.

5. An apparatus, according to claim 1, wherein said fluid control pressure communication line is controlled by a solenoid shut-off valve which blocks said fluid control pressure communication line when a solenoid magnet of said solenoid shut-off valve is energized, and by a solenoid-controlled shifting valve which blocks said fluid control pressure communication line and connects a portion of said fluid control pressure communication line downstream of said solenoid-controlled shifting valve with said over-pressure free release space when a solenoid magnet of said solenoid-controlled shifting valve is energized.

6. An apparatus, according to claim 5, wherein said throttle arrangement is formed by appropriately laying out a flow resistance of at least one of said solenoid-controlled shut-of valve and said solenoid-controlled shifting valve.

7. An apparatus, according to claim 1, wherein said fluid control pressure communication line is controlled by a first solenoid-controlled shut-off valve which blocks said fluid control pressure communication line when a solenoid magnet of said first solenoid-controlled shut-off valve is energized, and by a second solenoid-controlled shut-off valve which connects said fluid control pressure communication line with said over-pressure free release space when a solenoid magnet of said second solenoid-controlled shut-off valve is energized.

8. An apparatus, according to claim 7, wherein said throttle arrangement is formed by appropriately laying out a flow resistance of at least one of said solenoid-controlled shut-off valves.

9. An apparatus, according to claim 1, wherein at least one fluid pressure user fluid communication line belonging to said fluid pressure user circuit is configured to have a flow resistance such that at a complete opening of said valve units a user fluid pressure in said outlet chamber, and said fluid pressure user circuit is substantially equal.

10. An apparatus, according to claim 1, in which said relay valve apparatus is applicable to a plurality of fluid pressure user circuits with different volumes and wherein said $V_{SYSTEM}$ is said user circuit volume of a fluid pressure user circuit having a largest volume.

11. A relay valve apparatus comprising:
(a) a control chamber positioned within said relay valve apparatus, said relay valve apparatus being activated by a fluid control pressure supplied to said control chamber and by a reduction of said fluid control pressure, said control chamber being connected for fluid communication with a fluid control pressure fluid communication line;
(b) an outlet chamber positioned within said relay valve apparatus, said outlet chamber connected for fluid communication at an outlet side thereof to a fluid pressure user circuit;
(c) said outlet chamber being connectable at an inlet side thereof to a fluid pressure supply source and an overpressure free release space by means of a plurality of valve units; and
(d) a throttle arrangement positioned in said fluid control pressure communication line, a flow section $A_{thr}$ of said throttle arrangement obeying the formula $$A_{thr} \leq A_{VALVE} \cdot \frac{V_{CONTROL}}{V_{SYSTEM}}$$

wherein:
$A_{VALVE}$ is the flow section of the valve units when fully open;
$V_{CONTROL}$ is the control chamber volume; and
$V_{SYSTEM}$ is the user circuit volume.

12. An apparatus, according to claim 11, wherein compressed air is used as a fluid pressure medium and atmosphere serves as said over-pressure free release space.

13. An apparatus, according to claim 12, wherein said fluid control pressure communication line is controlled by a solenoid shut-off valve which blocks said fluid control pressure communication line when a solenoid magnet of said solenoid shut-off valve is energized, and by a solenoid-controlled shifting valve which blocks said fluid control pressure communication line and connects a portion of said fluid control pressure communication line downstream of said solenoid-controlled shifting valve with said over-pressure free release space when a solenoid magnet of said solenoid-controlled shifting valve is energized.

14. An apparatus, according to claim 12, wherein said fluid control pressure communication line is controlled by a first solenoid-controlled shut-off valve which blocks said fluid control pressure communication line when a solenoid magnet of said first solenoid-controlled shut-off valve is energized, and by a second solenoid-controlled shut-off valve which connects said fluid control pressure communication line with said over-pressure free release space when a solenoid magnet of said second solenoid-controlled shut-off valve is energized.

15. An apparatus, according to claim 11, wherein said fluid control pressure communication line is controlled by a solenoid shut-off valve which blocks said fluid control pressure communication line when a solenoid magnet of said solenoid shut-off valve is energized, and by a solenoid-controlled shifting valve which blocks said fluid control pressure communication line and connects a portion of said fluid control pressure communication line downstream of said solenoid-controlled shifting valve with said over-pressure free release space when a solenoid magnet of said solenoid-controlled shifting valve is energized.

16. An apparatus, according to claim 15, wherein said throttle arrangement is formed by appropriately laying out a flow resistance of at least one of said solenoid-controlled shut-off valve and said solenoid-controlled shifting valve.

17. An apparatus, according to claim 11, wherein said fluid control pressure communication line is controlled by a first solenoid-controlled shut-off valve which blocks said fluid control pressure communication line when a solenoid magnet of said first solenoid-controlled shut-off valve is energized, and by a second solenoid-controlled shut-off valve which connects said fluid control pressure communication line with said over-pressure free release space when a solenoid magnet of said second solenoid-controlled shut-off valve is energized.

18. An apparatus, according to claim 17, wherein said throttle arrangement is formed by appropriately laying out a flow resistance of at least one of said solenoid-controlled shut-off valves.

19. An apparatus, according to claim 11, wherein at least one fluid pressure user fluid communication line belonging to said fluid pressure user circuit is configured to have a flow resistance such that at a complete opening of said valve units a user fluid pressure in said outlet chamber, and said fluid pressure user circuit is substantially equal.

20. An apparatus, according to claim 11, in which said relay valve apparatus is applicable to a plurality of fluid pressure user circuits with different volumes and wherein said $V_{SYSTEM}$ is said user circuit volume of a fluid pressure user circuit having a largest volume.

* * * * *